United States Patent
Kolde

(10) Patent No.: US 9,294,996 B2
(45) Date of Patent: Mar. 22, 2016

(54) ENHANCED POWER MANAGEMENT IN COMMUNICATION DEVICE

(71) Applicant: Martin Kolde, Munich (DE)

(72) Inventor: Martin Kolde, Munich (DE)

(73) Assignee: Intel Deutschland GmbH, Neubiberg (DE)

( * ) Notice: Subject to any disclaimer, the term of this patent is extended or adjusted under 35 U.S.C. 154(b) by 60 days.

(21) Appl. No.: 13/758,213

(22) Filed: Feb. 4, 2013

(65) Prior Publication Data

US 2013/0225215 A1 Aug. 29, 2013

Related U.S. Application Data

(60) Provisional application No. 61/602,798, filed on Feb. 24, 2012.

(51) Int. Cl.
H04W 52/02 (2009.01)

(52) U.S. Cl.
CPC .................. *H04W 52/0209* (2013.01)

(58) Field of Classification Search
CPC ................................ H04W 52/0209
USPC ........... 455/466, 458, 456.1–456.6, 574, 434, 455/552.1, 553.1, 435.2; 370/328, 338
See application file for complete search history.

(56) References Cited

U.S. PATENT DOCUMENTS

| 8,570,993 | B2 * | 10/2013 | Austin et al. | 370/338 |
| 8,718,675 | B1 * | 5/2014 | Choi et al. | 455/456.1 |
| 2008/0171559 | A1 * | 7/2008 | Frank et al. | 455/456.5 |
| 2008/0198818 | A1 * | 8/2008 | Montemurro et al. | 370/338 |
| 2009/0168676 | A1 * | 7/2009 | Olson | 370/311 |
| 2009/0239574 | A1 * | 9/2009 | Hussain | 455/552.1 |
| 2010/0257657 | A1 * | 10/2010 | Hamann et al. | 2/167 |
| 2011/0153805 | A1 * | 6/2011 | Beninghaus et al. | 709/224 |
| 2011/0286437 | A1 * | 11/2011 | Austin et al. | 370/338 |
| 2012/0113971 | A1 * | 5/2012 | Giaretta et al. | 370/338 |
| 2012/0257657 | A1 * | 10/2012 | Subrahmanya et al. | 375/222 |
| 2013/0165052 | A1 * | 6/2013 | Chuang | 455/67.11 |

FOREIGN PATENT DOCUMENTS

| CN | 1744763 A | 3/2006 |
| CN | 102063449 A | 5/2011 |
| CN | 102238693 A | 11/2011 |
| CN | 103298080 A | 2/2013 |

OTHER PUBLICATIONS

"Chinese Application Serial No. 201310056611.3, Office Action mailed Jul. 1, 2015", 8 pgs.

* cited by examiner

*Primary Examiner* — Brandon Miller
(74) *Attorney, Agent, or Firm* — Schwegman Lundberg & Woessner, P.A.

(57) ABSTRACT

Representative implementations of devices and techniques provide enhanced power management in a communication device. In one implementation, an efficient processor, such as a baseband processor, is at least partially responsible for determining if a Wi-Fi transceiver is to be enabled. In one example of the implementation, the efficient processor leverages location based information, during regular paging intervals, in determining if a Wi-Fi transceiver is to be enabled. Such location based information may include the use of radio-location signal measurements from base stations/cell towers, using GPS/A-GPS, GLONAS, or using proximity to access points by way of NFC or Bluetooth transceivers.

17 Claims, 3 Drawing Sheets

ENHANCED POWER MANAGEMENT IN COMMUNICATION DEVICE

RELATED APPLICATION

This Application priority benefit of Provisional Application 61/602,798, filed on Feb. 24, 2012. The entire contents of the Provisional Application are incorporated herein by reference.

BACKGROUND

Wireless communication systems are well known and in widespread use. Cellular communication networks typically include a plurality of base stations geographically located to serve corresponding regions or cells. Mobile stations such as cell phones, personal digital assistants and laptop computers communicate using radio frequency signals through the base stations to a cellular network, which facilitates communications with other devices.

Other wireless communication technologies are available, such as IEEE 802.11 wireless fidelity (Wi-Fi) communications. Wi-Fi communications typically have higher bandwidth capability than connectivity available through cellular networks. However, Wi-Fi communication capability is generally a near-range communication technology. Typical effective communication ranges are from about fifty to several hundred meters. One or more Wi-Fi access points are typically used to service a Wi-Fi communications network.

Some mobile stations have the capability of communicating using a cellular network, Wi-Fi communications or both. Some known mobile stations have a manager element that switches between Wi-Fi and cellular-based (e.g., Wide-area Local Network IP connectivity) communications based on the availability of each network and other criteria such as application needs, etc. With such devices, the connection element, often embodied in software and driven by an application processor, relies upon a Wi-Fi transceiver of the mobile station to provide an indication whether a Wi-Fi communication network is currently available. Leaving a Wi-Fi transceiver switched on for this purpose undesirably utilizes battery power because the Wi-Fi transceiver must be switched on even while it is not being used. Therefore, many users appear to disable Wi-Fi due to mitigate undesirable battery drain. However, leaving it off may lead to connectivity issues as well as sub-optimal power usage as the cellular transceiver may have to use more power for high-throughput communication with a base station. And, constant user interaction with a connection element to enable/disable the Wi-Fi transceiver does not provide for a seamless and streamlined user experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Representative implementations of devices and techniques provide enhanced power management in a communication device. In one implementation, an efficient processor, such as a baseband processor, is at least partially responsible for determining if a Wi-Fi transceiver is to be enabled. In one example of the implementation, the efficient processor leverages location based information, during regular paging intervals, in determining if a Wi-Fi transceiver is to be enabled. Such location based information may include the use of radio-location signal measurements from base stations/cell towers, using GPS/A-GPS, GLONAS, using proximity to access points by way of NFC or Bluetooth transceivers, and/or one or more gyroscopes, accelerometers, or other similar location information providing arrangements. Once location is known, the efficient processor may correlate the location with a database of known locations in which a one or more Wi-Fi access points are determined to exist. Such a database may be stored in the mobile device associated with the efficient processor, so connectivity to the Internet is not a necessary requirement. If one or more Wi-Fi access points are available, the efficient processor may trigger the Wi-Fi processor (e.g., power-on or wake from idle or sleep mode) to execute an active or passive scan for an access point.

Various implementations, including techniques and devices, are discussed with reference to the figures. The techniques and devices discussed may be applied to any of various network designs, circuits, and devices and remain within the scope of the disclosure.

Implementations are explained in more detail below using a plurality of examples. Although various implementations and examples are discussed here and below, further implementations and examples may be possible by combining the features and elements of individual implementations and examples.

Example Communication System

Figure 1:
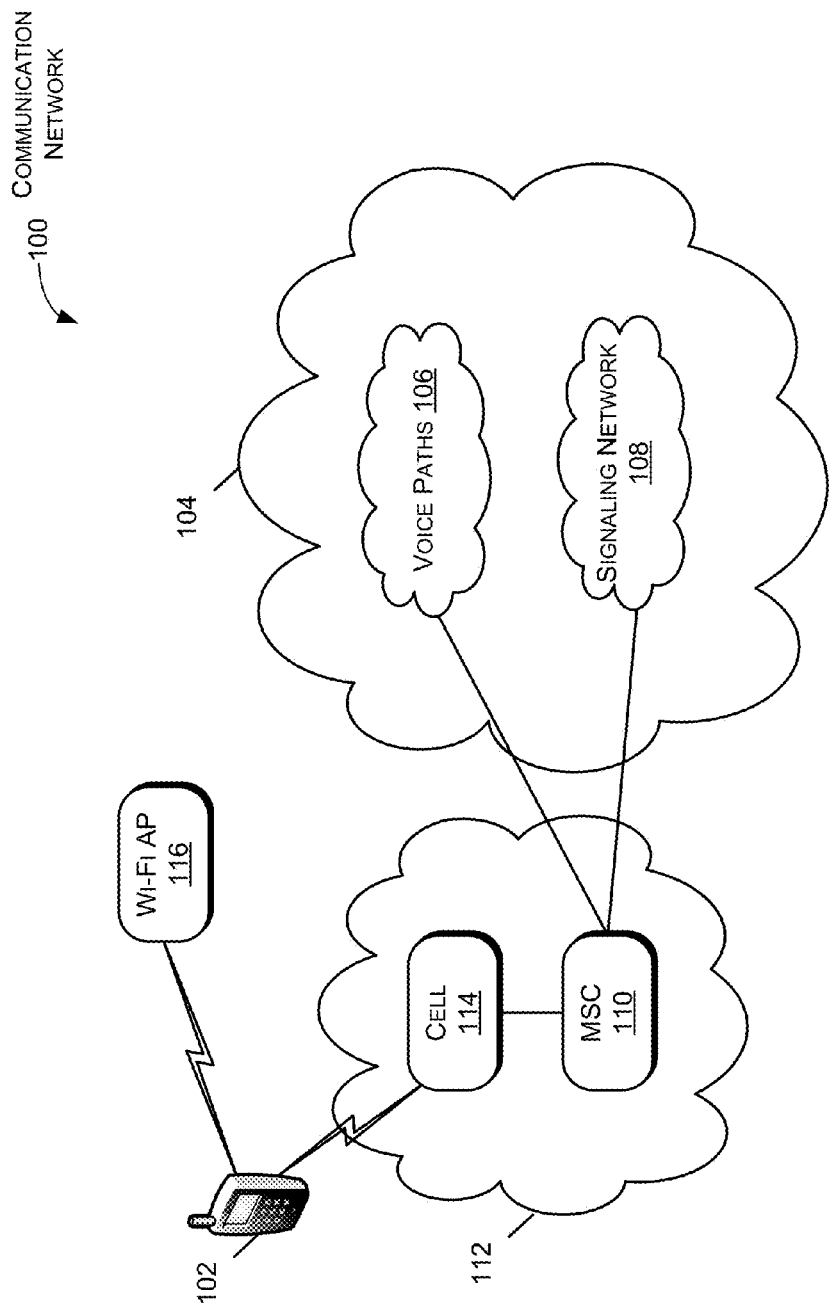
FIG. 1 is a diagram of a communication network that may be in communication with a user equipment (UE) that implements enhanced power savings according to the implementations described herein.

FIG. 1 is a diagram of a communication network 100 that may be in communication with a UE 102 that implements power savings according to the implementations described herein. The UE 102 may be a mobile phone, wireless capable computer, or another wireless communication device type.

The UE 102 is capable of coupling wirelessly to a Wi-Fi access point 116. The communication network 100 may include a Publicly Switched Telephone Network (PSTN) 104. The PSTN 104 may generally include a plurality of voice paths 106 and a signaling network 108 that handles data communication. Other components, which are known, such as signal transfer points, tandem switching systems, local switching systems, selective routers, and the like, are not illustrated in the communication network 100 of FIG. 1.

A mobile switching center (MSC) 110 may be connected to the PSTN 104 via both the voice paths 106 and signaling network 108. The MSC 110 may be part of a PLMN 112. For simplicity, a single PLMN 112 is illustrated. However, there may be multiple PLMNs 112 in a given geographical area, and any one of the multiple PLMNs 112 may be utilized by the UE 102. In general, the UE 102 and the PLMNs 112 may be utilized within any number of wireless communication systems including, but not limited to, time-division multiple access (TDMA) systems, such as cellular radio telephone systems that comply with the global system for mobile communications (GSM) telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards; and digital communication systems also include combined TDMA and CDMA systems, such as cellular radio telephone systems that comply with the universal mobile telecommunications system (UMTS) standard, which specifies a third generation (3G) mobile system developed by the European Telecommunications Standards Institute within the International Telecommunication Union's IMT-2000 framework. Such wireless communication systems may implement high-speed downlink packet access (HSDPA), which is an evolution of WCDMA that provides higher bit rates by using higher order modulation, multiple spreading codes, and downlink-channel feedback information. Another evolution of WCDMA is Enhanced Uplink (EUL), or High-Speed Uplink Packet Access (HSUPA), that enables high-rate packet data to be sent in the reverse, or uplink, direction. Furthermore, such wireless communication systems may include new RATs that are being considered for evolved 3G and fourth generation (4G) communication systems.

The MSC 110 may be connected to a plurality of cell sites, represented herein as a cell site 114, either directly or via base station controllers (not illustrated). Each cell site 114 supports telephony functions for a plurality of mobile communication devices, represented by the UE 102 that implements a wireless device or apparatus that includes enhanced power savings according to implementations herein.

Figure 2:
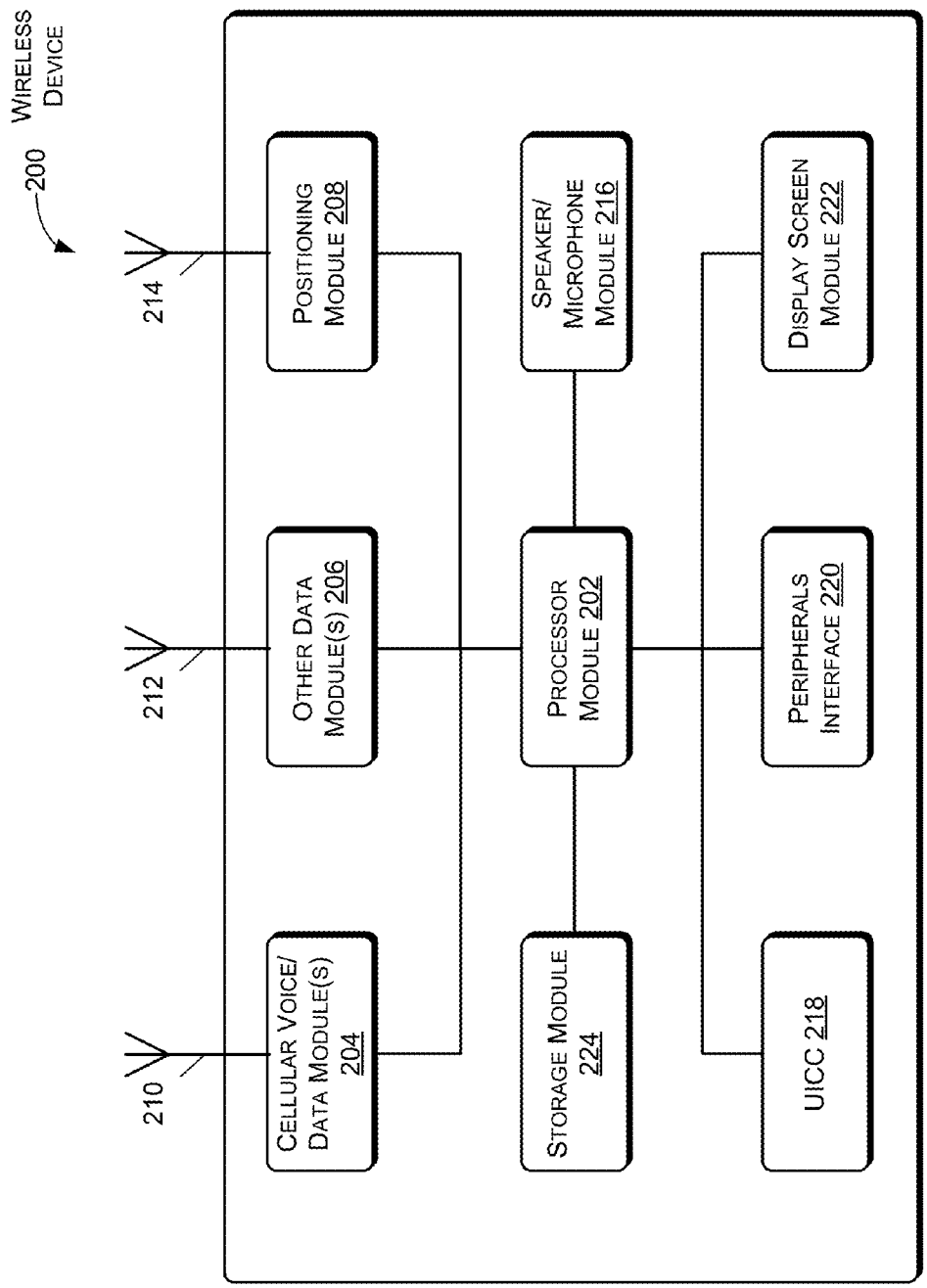
FIG. 2 is a diagram of a wireless device or apparatus that may have enhanced power savings techniques according to one or more implementations.

FIG. 2 is a diagram of a wireless device, UE or apparatus 200 that may have enhanced power savings according to the implementations described herein. The wireless device or apparatus 200 may include a processor module 202 coupled to a plurality of wireless modules that enable the wireless device or apparatus 200 to communicate wirelessly. In one implementation, the processor module 202 is an application processor.

The wireless modules may include a cellular voice/data module 204, other data module(s) 206 (e.g., Bluetooth, Wi-Fi, NFC module(s), and/or gyroscope and accelerometer modules), and a positioning module 208 (e.g., GPS module). In one implementation, the module 204 is a combined baseband/transceiver processor module. In another implementation, the module 204 is a plurality separate modules that include a baseband processor, communication transceiver processor, communication processor and other processors. The wireless device or apparatus 200 is not limited to the illustrated wireless modules. Each of the wireless modules is coupled to an antenna 210, 212 and 214, respectively. Although the antennas 210, 212 and 214 are shown as separate antennas, a single unitary antenna port that couples to multiple antennas may also be used and coupled to the modules 204-208.

The processor module 202 may also be coupled to a speaker/microphone module 216, an integrated circuit card (UICC) loaded with a subscriber identity module (SIM) or a universal subscriber identity module (USIM) 218, a peripherals interface 220 and a display module 222. Furthermore, the processor module 202 may be coupled to a storage module 224. The storage module 224 may be a nonvolatile storage or volatile storage.

The storage module 224 may include a database of known locations in which a one or more Wi-Fi access points are determined to exist. The database of known locations and corresponding Wi-Fi access points is populated by a variety of methods including but not limited to adding access points owned and operated by the operator of a cellular network, collecting usage information of other access points as reported by a plurality of mobile devices, populated at the time of provisioning of the wireless device 200, and so on.

The wireless device or apparatus 200 may be configured to transmit and receive voice and data communications to and from the MSC 110 via the cell site 112. Such communications may include voice communications directly from a user and via the speaker/microphone module 216, data generated from peripherals coupled to the peripherals interface 220 and received via the display screen module 222, and positioning information from the positioning module 208. The wireless device or apparatus 200 may also be configured to transmit and receive voice and data communications via the Wi-Fi access point 116.

Depending on the targeted implementation, the wireless device or apparatus 200, or parts thereof, may be an integral part of a larger system, such as a vehicle. Alternatively, the wireless device or apparatus 200, or parts thereof, may be a separate component included in a device such as a portable cellular or personal communication system (PCS), a pager, or a hand-held computing device such as a personal digital assistant (PDA).

Each of the wireless modules 204-208 includes a transmitter to transmit and encode voice and data messages using antennas 210-214, respectively, via an over-the-air protocol such as CDMA, WCDMA, GSM, TDMA, 802.11x or the like. The wireless modules 204-208 may also be configured to transmit by other wireless communications, such as satellite communications. Each of the wireless modules 204-208 also includes a receiver to receive and decode voice and data messages from the cell site 112 and the MSC 110, or Wi-Fi access point 116, or any other component associated with the communication network 100. Such received voice and data messages may be received via an over-the-air protocol such as CDMA, WCDMA, GSM, TDMA, 802.11x or the like. The wireless modules 204-208 may also be configured to receive other wireless communications, such as satellite communications. The transmitters and receivers may be integrated transceiver devices.

As used herein, the term "processor" is meant generally to include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, secure microprocessors, and application-specific integrated circuits (ASICs). Such digital processors may be contained on a single unitary IC die, or distributed across multiple components.

If included, the storage module 224 may store executable instructions, software, firmware, operating systems, applications, preselected values and constants, and the like, to be executed or used by any processor referred to herein, for example. In various implementations, the memory 208 may include computer-readable media. Computer-readable media may include, for example, computer storage media. Computer storage media, such as storage module 224, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device (such as the modules 202 and 204). Although the computer storage media (storage module 224) is shown within the wireless device 200 it will be appreciated that the storage module 224 may be distributed or located remotely and accessed via a network or other communication link. Furthermore, as used herein, any described module and associated functionality may be realized hardware, software, or a combination of hardware and software.

Example Operations

Exemplary enhanced power savings will now be described, with reference to device, apparatus and module types referred to in FIGS. 1-2. The enhanced power savings concepts described in the following may implemented in hardware, software, or a combination of both. Furthermore, the enhanced power savings concepts described herein may be implemented as computer executable instructions.

As described, a wireless device may include a baseband processor, communication processor, or other efficient processor. The communication or efficient processor may receive paging signals or messages from a communication network element, such as a cell site. The communication or efficient processor is enabled in a powered on state during paging intervals when such paging signals or messages are expected from the cell site. Otherwise, the communication or efficient processor may be in an idle, reduced power, or otherwise completely disabled (no power supply) state. Therefore, a paging interval is simply a time interval (e.g., 1 second) during which the communication or efficient processor is actively available for receiving and processing messages from the cell site.

In one implementation, an active state, such as during a paging interval or other time interval, of the communication or efficient processor is leveraged for determining if a Wi-Fi transceiver should be enabled to scan for access point channels. Enabling the Wi-Fi transceiver includes, for example, providing power to the Wi-Fi transceiver or waking the Wi-Fi transceiver from a low power sleep state. Other active states of the communication or efficient processor may be leveraged for determining if the Wi-Fi transceiver should be enabled to scan for access point channels. For example, the communication or efficient processor may be in an active state when required by its internal stack (e.g., communication stack).

Scanning for access point channels can be done passively or actively. Passive scanning requires the Wi-Fi transceiver, with active assistance from the application processor, to periodically wait for broadcast beacons from access point(s). Channels can also be scanned actively which requires the Wi-Fi transceiver, with active assistance from the application processor, to proactively probe for access points. The active scanning process begins with the Wi-Fi transceiver switching to channel and transmitting a probe. Following the probe, the Wi-Fi transceiver, with active assistance from the application processor, starts a timer. If no transmissions are heard by a time called the minimum channel time, the channel is declared empty and the Wi-Fi transceiver restarts the process on a new channel. Because the application processor is generally in involved in the passive and active scanning processes, power consumption during scanning is significant.

During an active state thereof, such as during a predetermined time interval, the communication or efficient processor may leverage or use a first location-based information to determine if the Wi-Fi transceiver is to be enabled to scan for an access point. The Wi-Fi transceiver may be activated when the cellular signals received by the wireless device and ascertained by the communication or efficient processor are in a particular known location. Such a particular known location may be fairly easily determined, since the wireless device is constantly seeking out signals from cell towers that serve the area that the wireless device is currently positioned. Such known location may be formulated as the first location-based information. As the wireless device scans for cellular signals, it also receives a signal strength, a timing, and a certain amount of noise with the signal. This could include, for instance, a decibel level (to within a tolerance or threshold), a Signal to Noise plus Interference Ratio (SNIR), etc. Further, a plurality of signals from a plurality of cell towers is combined together to create a cellular sector. This combination of characteristics provides unique information for that particular location within the cell sector that wireless device is being used in. For instance, a home or office building will have a different radio frequency signature than a park setting, although both locations are served by the same cell sector. Consequently, a particular radio frequency signature can be associated with a specific location, and any available Wi-Fi access points can be associated with that particular location and stored in a database that the communication or efficient processor can access and search to determine if the Wi-Fi transceiver is to be enabled to perform a scan for an access point.

In another implementation, during an active state thereof, such as during a predetermined time interval, the communication or efficient processor may use a second location-based information to determine if the Wi-Fi transceiver is to be enabled to scan for an access point. The Wi-Fi transceiver may be activated when the wireless device and ascertained by the communication or efficient processor determining (via GPS, NFC, or other methods) that wireless device is in the proximity of an access point. Anytime the wireless device is aware of its location, a correlation can be made with either a database of available Wi-Fi access points stored in the wireless device, or a database on a network or in the cloud. Such location awareness information may be formulated as the second location-based information. Generally, a GPS module is employed to determine a location of wireless device. Alternatively, such location information may be obtained from a cell tower location identification, also known as cellular tower based localization information for providing location information. In another implementation, a gyroscope, accelerometer or other movement detecting module may be leveraged by the processor to determine if the Wi-Fi transceiver is to be enabled to scan for an access point. In particular, if movement is ascertained as being above a particular threshold, the processor may not enable the Wi-Fi transceiver.

In alternate implementations, one or more of the above techniques may be employed concurrently, or another technique may be used to accomplish the same or similar results. The implementations herein are described in terms of exemplary embodiments. However, it should be appreciated that individual aspects of the implantations may be separately claimed and one or more of the features of the various embodiments may be combined.

Representative Processes

Figure 3:
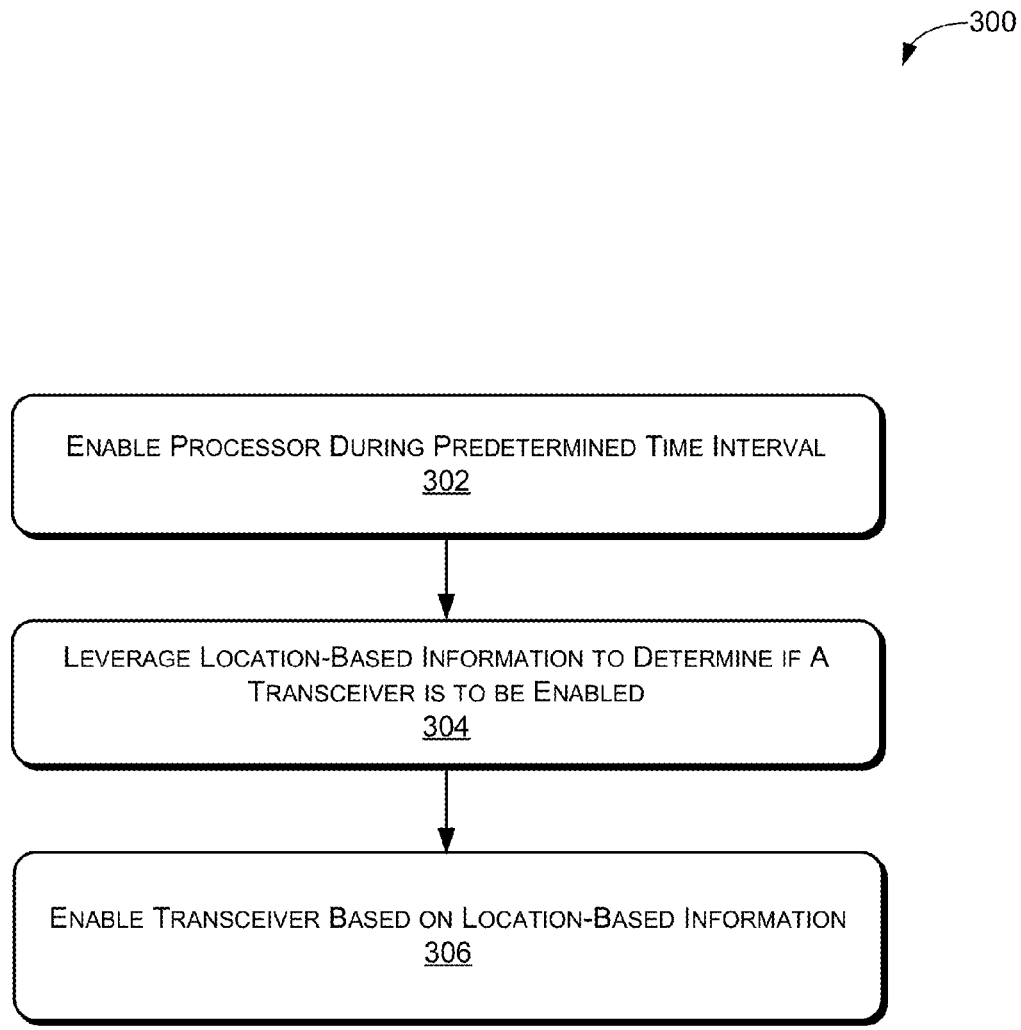
FIG. 3 illustrates a representative process 300 for enabling enhanced power management in a communication device, such as a wireless device capable of communicating over cellular and Wi-Fi networks.

FIG. 3 illustrates a representative process 300 for enabling enhanced power management in a communication device, such as a wireless device capable of communicating over cellular and Wi-Fi networks.

At Act 302, a processor, such as a communication or efficient processor that is not an application processor, is enabled during a predetermined time interval. In one implementation, the time interval is a paging interval when paging signals or messages are expected from a cell site. Therefore, a paging interval may be a time interval (e.g., 1 second) during which the communication or efficient processor is actively available for receiving and processing messages from the cell site.

At Act 304, the processor may leverage a first location-based information or a second-location based information, or both, to determine if a transceiver is to be enabled to scan for an access point. In one implementation, the transceiver is a Wi-Fi transceiver. The first location-based information may be based on cellular signals received by an apparatus associated with the processor, such as a wireless apparatus. The second location-based information may be based on one or more location determining modules of an apparatus associated with the processor, such as a wireless apparatus. The one or more location determining modules may include, position determining modules (e.g., GPS), Bluetooth, Wi-Fi, NFC module(s), and/or gyroscope and accelerometer modules.

At Act 306, the processor enables the transceiver based on the first location-based information or the second-location based information, or both. In one implementation, enabling the transceiver causes the transceiver to scan for one or more Wi-Fi access points.

The foregoing techniques achieve enhanced power savings for a wireless device or the like by reducing active states of inefficient devices in the wireless device. For example, the foregoing techniques enable scanning for Wi-Fi access points when location and proximity merit such scanning. Furthermore, the decision to enable the Wi-Fi transceiver for scanning is made by a communication or an efficient processor during an active time interval, such as a paging interval. In one example, the communication or efficient processor is a baseband processor, a separately enabled processor in the Wi-Fi transceiver, a processor of the cellular transceiver. In one example, the efficient processor is not the application processor of the wireless device.

The arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:

1. User Equipment (UE) comprising:
a Wireless Local Area Network (WLAN) transceiver for communicating with WLANs;
a cellular network transceiver configured receive access point location information from a cellular network during a regular paging interval, the access point location information indicating locations of access points of the WLANs;
an applications processor to run one or more applications on the UE, the applications processor to actively assist the WLAN transceiver during scanning operations when the WLAN transceiver is active; and
a communications processor for baseband processing, the communications processor enabled in a powered on state during paging intervals and configured to be in a low-power state between paging intervals, the communications processor, when enabled, is to determine whether an access point is in communication range of the UE and activate the WLAN transceiver based on the access point location information and a current location of the UE,
wherein determination of whether an access point is in communication range of the UE is made by the communications processor when enabled and while the WLAN transceiver is inactive and not receiving WLAN signals,
wherein the communications processor, when enabled, activates the WLAN transceiver to perform a scan when an access point is determined to be in communication range of the UE.

2. The UE of claim 1 wherein the communications processor is to determine during the regular paging interval whether to activate the WLAN transceiver or not activate the WLAN transceiver based on whether an access point is determined to be in communication range.

3. The UE of claim 1 wherein the applications processor is configured to:
enable the communications processor during the regular paging intervals; and
disable the communications processor outside the regular paging intervals.

4. The UE of claim 3 wherein during the regular paging intervals, the communications processor is configured to trigger the WLAN transceiver to scan for WLAN channels.

5. The UE of claim 4 wherein the communications processor is configured to cause the WLAN transceiver to perform passive scanning by waiting for beacons from an access point.

6. The UE of claim 4 wherein the UE is configured to ascertain movement of the UE with respect to the access point location information to determine if access points are in communication range to trigger the WLAN transceiver to scan for WLAN channels.

7. The UE of claim 4 wherein the access point location information includes locations of access points that are accessible to the UE.

8. The UE of claim 4 wherein the access point location information includes locations of access points that are operated by a network provider of the cellular network.

9. The UE of claim 8 wherein the UE is configured to access a server via the cellular network to retrieve the access point location information during the regular paging interval.

10. The UE of claim 4 wherein the UE is configured to provide current UE location information to the cellular network for use by the cellular network in retrieving the access point location information of nearby access points.

11. The UE of claim 10 wherein the communications processor is configured to use the current UE location information to keep the WLAN transceiver in a low-power state until an access point is in communication range.

12. The UE of claim 1 wherein the communications processor is a more-efficient baseband processor, and
wherein the applications processor is configured to offload WLAN scanning operations to the communications processor.

13. A method performed by user equipment (UE) comprising a Wireless Local Area Network (WLAN) transceiver and cellular network transceiver, the method comprising:
configuring the cellular network transceiver to receive access point location information from a cellular network during a regular paging interval, the access point location information indicating locations of access points of the WLANs;
running on an applications processor, one or more applications, the applications processor to actively assist the WLAN transceiver during scanning operations when the WLAN transceiver is active;
determining, at least in part, by a communications processor, whether an access point is in communication range of the UE and whether to activate the WLAN transceiver based on the access point location information and a current location of the UE, the communications processor configured for baseband processing and enabled in a powered on state during paging intervals and configured to be in a low-power state between paging intervals,
wherein determination of whether an access point is in communication range of the UE is made by the communications processor when enabled and while the WLAN transceiver is inactive and not receiving WLAN signals, and
wherein the communications processor, when enabled, activates the WLAN transceiver to perform a scan when an access point is determined to be in communication range of the UE.

14. The method of claim 13 further comprising determining by the communications processor during the regular paging interval whether to activate the WLAN transceiver or not activate the WLAN transceiver based on whether an access point is in communication range.

15. The method of claim 13 further comprising the applications processor:
enabling the communications processor during the regular paging intervals; and
disabling the communications processor outside the regular paging intervals.

16. A non-transitory computer-readable storage medium that stores instructions for execution by one or more processors including an applications processor and a communications processor of user equipment (UE) comprising a Wireless Local Area Network (WLAN) transceiver and cellular network transceiver, the one or more processors to configure the user equipment (UE) to perform operations to:
configure the cellular network transceiver to receive access point location information from a cellular network during a regular paging interval, the access point location information indicating locations of access points of the WLANs;
run on the applications processor, one or more applications, the applications processor to actively assist the WLAN transceiver during scanning operations when the WLAN transceiver is active;
determine, at least in part, by a communications processor, whether an access point is in communication range of the UE and whether to activate the WLAN transceiver based on the access point location information and a current location of the UE, the communications processor configured for baseband processing and enabled in a powered on state during paging intervals and configured to be in a low-power state between paging intervals,
wherein determination of whether an access point is in communication range of the UE is made by the communications processor when enabled and while the WLAN transceiver is inactive and not receiving WLAN signals, and
wherein the communications processor, when enabled, activates the WLAN transceiver to perform a scan when an access point is determined to be in communication range of the UE.

17. The non-transitory computer-readable storage medium of claim 16 wherein during the regular paging intervals, the communications processor is configured to trigger the WLAN transceiver to scan for WLAN channels.

* * * * *